(12) United States Patent (10) Patent No.: US 8,073,222 B2
Marshall et al. (45) Date of Patent: *Dec. 6, 2011

(54) USER SELECTABLE AND USER DEFINABLE SCANNING PROTOCOLS IN MAMMOGRAPHIC FILM SCANNING SYSTEM WITH STACK FILM FEEDER

(75) Inventors: Julian Marshall, Los Altos, CA (US); Mark B. Ivey, Sunnyvale, CA (US); Brian T. Matuska, Stockton, CA (US)

(73) Assignee: Hologic, Inc., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,237

(22) Filed: Apr. 18, 2011

(65) Prior Publication Data

US 2011/0194157 A1  Aug. 11, 2011

Related U.S. Application Data

(63) Continuation of application No. 11/803,558, filed on May 15, 2007, now Pat. No. 7,929,740, which is a continuation-in-part of application No. 10/998,121, filed on Nov. 26, 2004, now abandoned.

(51) Int. Cl.
    *G06K 9/00* (2006.01)
(52) U.S. Cl. .......................... 382/128; 382/311; 715/700
(58) Field of Classification Search .................... 382/128
    See application file for complete search history.

(56) References Cited

U.S. PATENT DOCUMENTS

| | | | | |
|---|---|---|---|---|
| 5,917,929 A | * | 6/1999 | Marshall et al. | 382/128 |
| 6,031,929 A | * | 2/2000 | Maitz et al. | 382/132 |
| 6,574,629 B1 | * | 6/2003 | Cooke, Jr. et al. | 1/1 |
| 6,734,880 B2 | * | 5/2004 | Chang et al. | 715/738 |
| 6,853,857 B2 | * | 2/2005 | Pfeiffer et al. | 600/436 |
| 6,873,717 B2 | * | 3/2005 | Lure et al. | 382/128 |
| 6,915,154 B1 | * | 7/2005 | Docherty et al. | 600/431 |
| 7,015,808 B1 | * | 3/2006 | Sattler et al. | 340/531 |
| 7,146,031 B1 | * | 12/2006 | Hartman et al. | 382/132 |
| 7,406,150 B2 | * | 7/2008 | Minyard et al. | 378/37 |
| 7,639,780 B2 | * | 12/2009 | Minyard et al. | 378/37 |
| 7,929,740 B2 | * | 4/2011 | Marshall et al. | 382/128 |
| 2001/0041991 A1 | * | 11/2001 | Segal et al. | 705/3 |
| 2002/0097902 A1 | * | 7/2002 | Roehrig et al. | 382/132 |

(Continued)

FOREIGN PATENT DOCUMENTS

WO    WO 02/45437 A2 *  6/2002

(Continued)

*Primary Examiner* — Sath V Perungavoor
(74) *Attorney, Agent, or Firm* — Vista IP Law Group LLP (57) ABSTRACT

A system and method for processing mammographic data are described. The system includes a user input/output system adapted and configured to receive from a user a user-defined scanning protocol that identifies the laterality and view type for each mammographic film in a film case to be scanned. A storage system stores the user-defined scanning protocol for subsequent use in scanning film cases. A scanning system scans film cases and generates digitized versions of each mammographic film. A processor then assigns laterality and view types to the digitized versions of the mammographic film according to the user-defined scanning protocol. The system also receives user alterations to stored scanning protocols. The system can also re-assign a case scanned according to one scanning protocol to another scanning protocol in response to a user's instruction to do so. The system processes the digitized versions according to at least one computer aided detection (CAD) algorithm for detecting anatomical abnormalities therein.

17 Claims, 9 Drawing Sheets

U.S. PATENT DOCUMENTS

| | | | |
|---|---|---|---|
| 2003/0013951 A1* | 1/2003 | Stefanescu et al. | 600/407 |
| 2004/0114714 A1* | 6/2004 | Minyard et al. | 378/37 |
| 2004/0252871 A1* | 12/2004 | Tecotzky et al. | 382/128 |
| 2004/0258287 A1* | 12/2004 | Gustafson | 382/128 |
| 2005/0114039 A1* | 5/2005 | Kennedy et al. | 702/19 |
| 2006/0126909 A1* | 6/2006 | Marshall et al. | 382/128 |
| 2006/0173303 A1* | 8/2006 | Yu et al. | 600/437 |
| 2008/0049996 A1* | 2/2008 | Marshall et al. | 382/128 |
| 2008/0069416 A1* | 3/2008 | Luo | 382/128 |
| 2008/0279439 A1* | 11/2008 | Minyard et al. | 382/131 |
| 2009/0003679 A1* | 1/2009 | Ni et al. | 382/132 |
| 2010/0131873 A1* | 5/2010 | Mejia et al. | 715/764 |

FOREIGN PATENT DOCUMENTS

WO    WO 2004/049908 A1 *    6/2004

* cited by examiner

USER SELECTABLE AND USER DEFINABLE SCANNING PROTOCOLS IN MAMMOGRAPHIC FILM SCANNING SYSTEM WITH STACK FILM FEEDER

CROSS-REFERENCE TO RELATED APPLICATIONS

This patent application is a continuation of U.S. Ser. No. 11/803,558, filed May 15, 2007, which issued as U.S. Pat. No. 7,929,740 on Apr. 19, 2011, which is a continuation-in-part of U.S. Ser. No. 10/998,121, filed Nov. 26, 2004, now abandoned. Each of the above-referenced applications is incorporated by reference herein.

FIELD

This patent specification relates to processing medical images. More particularly, this patent specification relates to processing film-based medical images for storage, display and/or computer-aided detection (CAD) applications.

BACKGROUND

Computer-aided detection (CAD) generally refers to the use of computers to analyze medical images to detect anatomical abnormalities therein. Sometimes used interchangeably with the term computer-aided detection are the terms computer-aided diagnosis, computer-assisted diagnosis, or computer-assisted detection. CAD results are mainly used by radiologists and other medical professionals as "secondary reads" or secondary diagnoses tools. When analyzing a medical image, the radiologist usually makes his or her own analytical determinations before looking at the CAD results, which either verify those determinations or trigger further inspection of the image. Some CAD implementations have used CAD results in a "concurrent reading" context in which the radiologists look at the CAD results at the same time that they look at the images.

In the field of mammography, thousands of mammography CAD systems are now installed worldwide, and are used to assist radiologists in the interpretation of millions of mammograms per year. Mammography CAD systems are described, for example, in U.S. Pat. No. 5,729,620, U.S. Pat. No. 5,815,591, and U.S. Pat. No. 5,917,929, each of which is incorporated by reference herein. Mammography CAD algorithms analyze digital or digitized images of standard mammographic views (e.g. CC, MLO) for characteristics commonly associated with breast cancer, such as calcifications, masses, and architectural distortions. The outputs of CAD systems, generally referred to herein as CAD results, are sets of information sufficient to communicate the locations of anatomical abnormalities, or lesions, in a medical image, and can also include other information such as the type of lesion, degree of suspiciousness, and the like. CAD results are most often communicated in the form of reduced-resolution versions of the different mammographic views containing annotations that identify the location and type of potential abnormality. The radiologist analyzes the original mammogram, either in film format on a light box or in digital form on a softcopy workstation, and then reviews the CAD results, usually on a display monitor or a paper printout.

Workflow processes associated with mammography, including CAD-related workflow processes, implicate substantial cost issues in practical clinical environments. "All-digital" mammography environments, in which digitally captured mammograms could be automatically shepherded, with little or no human intervention, through CAD systems and related HIS/RIS (Hospital Information System/Radiology Information System) equipment directly to the radiologists' viewing workstations, have not yet become common. According to one estimate, approximately 90 percent of all mammography systems worldwide are still film-based units, and an equivalent percentage of all mammograms taken yearly are film-based mammograms rather than digital mammograms. Because film-based mammograms require digitization prior to performance of CAD algorithms, a substantial number of workflow-related issues can arise.

One important issue relates to the scanning and identification process for film-based mammograms. For a CAD algorithm to be effective, it is usually desirable for a typical 18×24 cm or 24×30 cm film mammogram to be digitized at about 50 microns of spatial resolution and about 12 bits of dynamic range. Even using today's scanning technologies, it can take a commercial film scanner 15-60 seconds to digitize one film at these resolutions, and therefore it can take 1-4 minutes to digitize a typical film case having 4 views. A stack of 20 cases can therefore take an hour to run through the digitizer. At least theoretically, the technologist who placed the film stack in the scanner should be able to perform other duties while the digitization is taking place. Progress has been made toward automation of the film scanning process. One example is WO 02/45437 A2, which is incorporated by reference herein, which describes automatic film orientation and identification based on lead view marker and breast outline segmentation. Another example is Published US Patent Application No. US20060126909A1, Ser. No. 10/998,121, filed on Nov. 26, 2004, which describes a graphical status indicator having a plurality of spatially ordered film case icons that graphically communicate a current state of the scanning to a technologist who may be performing other duties while the digitization is taking place. However, practical problems may still arise which may cause the technologist to spend substantial time and attention in the scanning and image identification process.

In order for the scanned images to be correctly identified and properly stored, each image must have information correctly associated with it. This information includes the case to which it belongs, as well as type of image (which side and which view). Film-based medical image scanning systems have conventionally assumed that each case to be scanned has a certain number of films and the films are stacked in a particular order. This pre-defined standard scanning protocol is defined by the manufacturer in advance based on what the manufacturer expects its most likely application to be. In many cases this standard scanning protocol is chosen as the common mammography screening case in the United States. This is commonly comprised of four films per study, ordered as follows: R MLO, L MLO, R CC and L CC.

However, a problem with such conventional approaches arises when the scanning system receives a case that does not have the same number of films, the films are ordered differently, and/or the views do not correspond to the standard scanning protocol set by the manufacturer. Even when automatic film orientation and identification is available, the lead markers may be inadequate. For example, the lead marker may be partially out of the frame or may be overlapping with part of the breast tissue or patient label. Further, the lead marker detection systems may especially have trouble correctly identifying view types that are not one of the four standard screening views.

Errors in film identification are costly and time consuming to correct. If the error is noticed by the technologist during the scanning process, the technologist may use a user interface to manually identify each image. If the technologist does not notice the error, the film may be associated with the wrong case. The radiologist may recognize the error during his or her review, and expend valuable time making a correction.

If the technologist or technician responsible for scanning the cases knows ahead of time that the case does not conform to the standard scanning protocol, the information may be manually entered. However, this may be unduly time consuming, and in many cases such non-standard cases are simply not scanned. If the case is not scanned at all, not only does the case forego the potential benefits of CAD processing, the case is also unavailable for analysis and comparison in later years, at a time when the move to all digital mammography may have taken place at the particular medical facility.

It is important to note that there are many ways in which the case may not conform to the manufacturer's standard scanning protocol. For example, diagnostic mammography cases commonly have more than four films and include other types of views such as ML, LMO, LM, XCC, XCCL, XCCM, FB and SIO for each breast. Certain types of populations may have different imaging procedures. For example, in some medical imaging facilities, certain ethnic populations may have a different standard screenings. A patient my have only one breast due to a prior mastectomy. Some geographic regions may have different screening protocols. For example in the Netherlands, after a standard four-film screening, in subsequent years screening mammography cases typically consist only of two films: R MLO and L MLO.

Some systems allow the user to specify a different number of films per case. One example is the SecondLook® 700 system from iCAD, Inc., which allows users to specify the number of slides per study. However, if one case in a large stack of cases has a missing film, or and extra film, then all of later scanned cases in the stack can have costly identification errors. Moreover, the user still must go through a time consuming process for each film of each case to identify the laterality, view and other critical information if the cases do not match one the standard cases supplied by the manufacturer.

Accordingly, it would be desirable to provide a system for medical film digitization that is easier for a technologist cases that do not correspond to a standard case that has been defined by the manufacturer, thereby leading to cost savings and increased productivity.

It would be further desirable to provide such a digitization and/or processing system in a manner that flexibly accommodates cases of different composition, thereby increasing the likelihood that the case is digitized and stored, thereby facilitating evolution from film environments to digital environments.

SUMMARY

A system, method, and related computer program products are provided for processing film-based mammographic data. The system preferably includes a user input/output system adapted and configured to receive from a user a user-defined scanning protocol that identifies the laterality and view type for each mammographic film in a film case to be scanned. A storage system is in communication with said input/output system, and is programmed and arranged to store the user-defined scanning protocol for subsequent use in scanning film cases. A scanning system is preferably adapted to receive and scan a plurality of film cases, generating therefrom a digitized version of each mammographic film. A processor in communication with said storage system and said scanning system is adapted and programmed to assign laterality and view types to the digitized versions of the mammographic film according to the user-defined scanning protocol. The user-defined scanning protocol preferably includes the number of films in each case and the sequence of the films. The system is preferably adapted to receive user alterations to stored scanning protocols. The system is also preferably adapted to re-assign a case scanned according to one scanning protocol to another scanning protocol in response to a user's instruction to do so. The system is also preferably adapted to process the digitized versions according to at least one computer aided detection (CAD) algorithm for detecting anatomical abnormalities therein.

DETAILED DESCRIPTION

Figure 1:
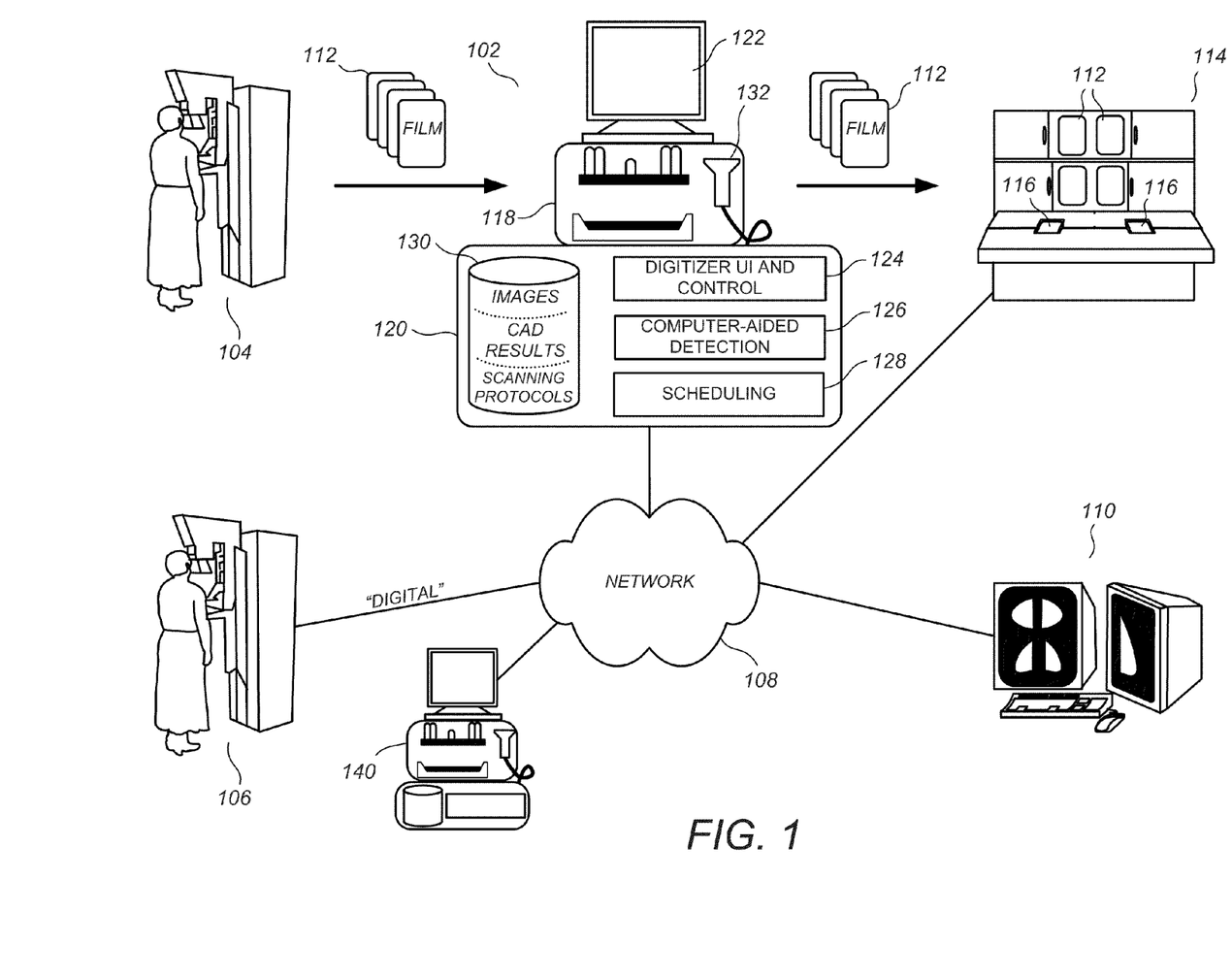
FIG. 1 illustrates a CAD station in a combination film-based and digital mammography environment according to embodiments.

FIG. 1 illustrates a CAD station 102 in a combination film-based and digital mammography environment according to an embodiment, including a film-screen mammogram acquisition device 104 and a digital mammogram acquisition device 106. The digital mammogram acquisition device 106 is coupled to a network 108, usually a network containing a HIS/RIS (Hospital Information System/Radiology Information System) and a PACS (Picture Archiving and Communications System). As used herein, the term "digital case" refers to a group of mammogram images corresponding to a patient and acquired from a digital mammogram acquisition device. Although asymptomatic persons undergoing the mammographic imaging process are often termed "clients" rather than "patients" in many clinics to denote that they are not symptomatic, the single term "patient" is used herein for simplicity and clarity of description. The group of digitally-acquired mammogram images forming the digital case is usually obtained during the same patient visit. The network 108 transfers the digital cases to the CAD station 102 for CAD processing. Upon successful completion of the CAD processing, CAD results are then transferred over the network 108 to a softcopy workstation 110 for review by a radiologist or other medical professional in conjunction with the digitally-acquired mammogram images. There may be more than one digital mammogram acquisition device, each having a different hardware address with respect to the network 108.

As used herein, the term "film case" refers to a group of mammogram images corresponding to a patient, the mammogram images being acquired using a film-based mammogram acquisition device. The group of mammogram images forming the film case is usually obtained during the same patient visit. Illustrated in FIG. 1 are film cases 112 that are physically carried over to the CAD station 102 for scanning and, optionally, CAD processing, and subsequently physically carried over to a film review station 114, which may or may not be configured to display CAD results. Upon successful completion of any CAD processing, CAD results are transferred over the network 108 to the film review station 114. In one common scenario, the film review station 114 comprises a motorized viewer upon which the film cases 112 are loaded and synchronized with digital displays 116 that show reduced-resolution versions of the mammogram images annotated with CAD markers and other information derived from the CAD results. Also shown in FIG. 1 is a second CAD station 140 connected to network 108. According to embodiments, CAD stations 102 and 140 can be used for creation, editing, storage and use of various scanning protocols as described in further detail herein. According to an embodiment, scanning protocols can be created and edited on one CAD station and then transmitted via network 108 for storage and use by another CAD station. According to yet further embodiments, stations 102 and 140 can be film scanning systems or film scanning platforms without CAD capability such as DigitalNow™ systems available from R2 Technology, Inc. Thus, according these alternative embodiments, references herein to "CAD station" refer instead to "film scanning station" or "film scanning platform."

Notably, the environment of FIG. 1 around the CAD station 102 is presented by way of example only and is not intended to limit the scope of the embodiments to this particular scenario. By way of example, many different setups can be used for reviewing film cases and their associated CAD results, such as simple light boxes in conjunction with paper printouts of the CAD results. By way of further example, different combinations of the devices of FIG. 1 can be placed adjacently to each other or integrated into the same hardware boxes without departing from the scope of the embodiments. By way of still further example, the network 108 can be a wide-area network with the different nodes being distributed throughout a city, a country, or the world. Alternatively, and by way of still further example, some or all of the transfer of digital information can be achieved by physical transfer of disks, memory sticks, or other digital media devices without departing from the scope of the embodiments. It is to be appreciated that although FIG. 1 illustrates a combined film/digital environment, many of the embodiments herein are applicable in film-only environments and/or in digital-only environments as well.

CAD station 102 comprises a film scanner 118, which can also be termed a film digitizer, for scanning and digitizing the film cases 112. The film scanner 118 can comprise a laser scanner such as the Model 2908 Laser Film Digitizer from Array, Inc. Alternatively, the film scanner 118 can comprise a CCD scanner or other scanner having similar film scanning capabilities as the above laser and/or CCD scanners. The CAD station 102 further comprises a processor 120 and a display 122, which is preferably a touchscreen display but which can alternatively be implemented on a non-touchscreen monitor using an associated mouse or other pointing/selection device. The processor 120 comprises a digitizer user interface and control unit 124, a computer-aided detection (CAD) unit 126, a scheduling unit 128, and a data storage unit 130.

According to one embodiment, the functionalities of the digitizer user interface unit 124, the computer-aided detection (CAD) unit 126, the scheduling unit 128, and the data storage unit 130 are combined into a single, off-the-shelf personal computer (PC) box having an Intel Pentium IV processor with hyper-threading capability and running the Linux operating system. The user-interface, scanning control, data transfer, and scheduling functionalities described herein can be programmed in C++ using the GTK toolkit and G++compiler.

The data storage unit 130 stores received digital cases and scanned film cases, along with their associated CAD results, according to a circular buffer arrangement based on times received and scanned. Cases are queued for CAD processing in the order of priority and, within a particular priority, in the order of time received or scanned. In one embodiment, all film cases are assigned a medium priority, while digital cases are assigned a high, medium, or low priority according to which digital mammography acquisition device they originated from, this priority level being assigned at the installation time of the CAD station 102 or during a maintenance session thereof. In another embodiment, the CAD station 102 may expose more than one port, or expose more than one DICOM Application Entity (AE), to the HIS/RIS network, with each port or AE corresponding to a different priority level. In this case, each of the digital mammogram acquisition workstations can establish associations with the desired port or AE according to a desired CAD processing priority determined at the digital mammogram acquisition workstation, and priority levels can thereby be assigned on a per-case basis. Any of a variety of other prioritization schemes are within the scope of the embodiments. According to embodiments, data storage unit 130 also stores scanning protocols to be used in scanning film cases and assigning to each scanned film laterality, views and other information as described further herein.

CAD station 102 further comprises a handheld barcode scanner 132 that facilitates convenient access to any particular film case based on the barcode of its case separator sheet. In a typical film-based CAD workflow, a separator sheet having a CAD case ID is placed on top of the first sheet of each film case in a stack of film cases being fed into the film scanner 118, as described in WO 02/43457 A2. The CAD case ID, which is temporarily unique but generally re-usable according to the number of separator sheets in use at the clinic, is associated with a patient ID, case ID, accession number, etc., of a particular patient for a particular mammogram case, usually just before the acquisition of the film mammogram, in accordance with whichever HIS/RIS database system is used at that clinic. As described in WO 02/43457 A2, during scanning of the film stack, the film scanner reads the barcode of each separator sheet to differentiate the respective film cases, as well as to allow association between that CAD case ID and the rest of the information for that film case. The technologist can preferably simply scan the barcode on the separator sheet using the handheld barcode scanner 132, and the information is instantly displayed on the display 122.

Figure 2:
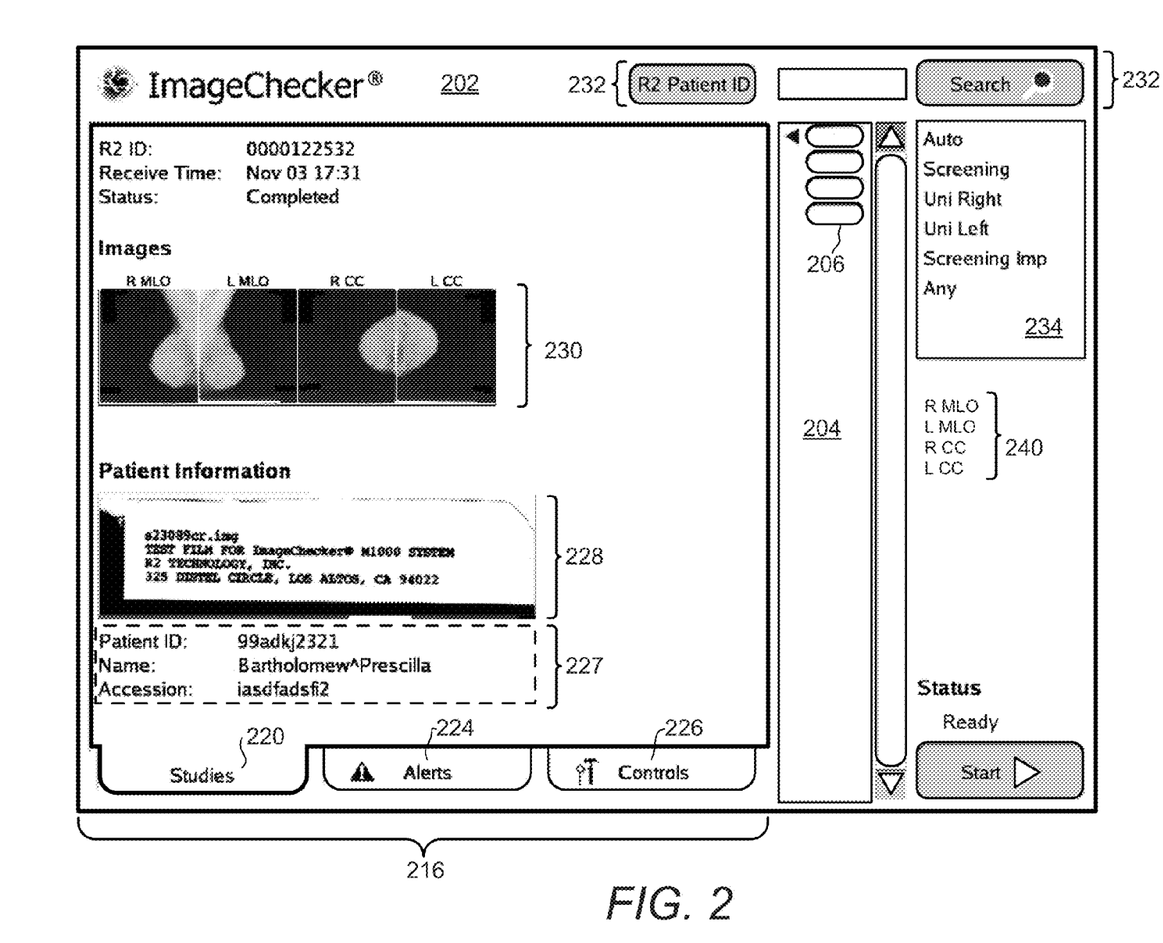
FIG. 2 illustrates a display screen corresponding to the CAD station of FIG. 1 according to embodiments.

FIG. 2 illustrates a display screen 202 corresponding to the CAD station of FIG. 1 according to an embodiment. As described more fully in Published US Patent Application No. US20060126909A1, Ser. No. 10/998,121, incorporated herein by reference, display screen 202 comprises a graphical status indicator 204 which comprises a plurality of case icons 206, each case icon corresponding to one of the cases (film or digital) received by the CAD station 102. Display 202 further comprises a detail display area 216 within which the user can view any of the details associated with a studies tab 220, an alerts tab 224, and a controls tab 226. The alerts tab 224 invokes an alert history listing, and the tab itself shows a triangular alert icon if there are any alerts present since last being cleared. The controls tab 226 allows access to a variety of maintenance and configuration screens, and the tab itself shows a small wrench icon if there is something requiring maintenance-related attention (e.g., it is time to perform periodic calibration or other maintenance activity, or a diagnostic error occurred on startup, etc.). According to an embodiment, controls tab 226 is also used to access the facility for creating, editing and deleting scanning protocols, as described more fully below.

The studies tab 220 causes the details of the currently selected case to be displayed, including text details 227, a patient flash area 228 containing the flash of a scanned film, and a thumbnail area 230 showing thumbnails of mammographic views that have been scanned and/or processed thus far. The display 202 further comprises a search area 232 allowing searching by any of a variety of criteria (e.g., patient ID, patient name, CAD case ID, accession number, etc.). Patient ID area 233 allows for the display of the patient ID. A scanning protocol selection area 234 allows the user to select between several different scanning protocols. As used herein, the term "scanning protocol" refers to a defined composition of films in a stack of films loaded in the scanner feeder. The scanner assumes that the films will be separated in to cases, each having the composition according to the selected scanning protocol. As used herein, the term "user" refers to a lead technician, technician or other scanner operator that is generally employed by or otherwise associated with the medical facility where the scanning and/or CAD systems are installed and operated. The term "user" is not intended to refer to employees, contractors or agents of the manufacturer and/or designers of the scanning and/or CAD systems.

According to an embodiment, display screen 202 includes a number of predefined scanning protocols. Scanning protocol selection area 234 is shown including six different scanning protocols. The "Auto" scanning protocol provides automatic film orientation and identification based on lead view marker and breast outline segmentation is performed (see WO 02/43457 A2, supra). "Auto" assumes that (1) there are likely to be four films per study, (2) the films are taken using recognized lead markers for correct identification, the (3) the cases consist of the four standard screening views (RCC, LCC, RMLO and LMLO). The "Any" scanning protocol makes no assumption about what films are in the cases. This scanning protocol requires manual identification of each image after scanning. Other scanning protocols can be provided as listed in the Table 1, however according to embodiments described herein, the user can edit, delete and create new scanning protocols in order to customize and improve the scanning process.

TABLE 1

| Scanning Protocol | Composition |
| --- | --- |
| Screening | RCC, LCC, RMLO, LMLO |
| Uni Right | RCC, RMLO, RXCC |
| Uni Left | LCC, LMLO, LXCC |
| Screening Imp | RCC, LCC, RMLO, LMLO, RCCID, LCCID, RMLOID, LMLOID |

The user preferably selects the desired scanning protocol using the touch screen on protocol selection area 234. After selection, the selected scanning protocol is highlighted to indicate which protocol will be used for scanning. If no user selection is made, a default scanning protocol is used for the scanning, which is preferably the first scanning protocol listed in selection area 234. The first scanning protocol listed can be changed by the user in order to change the default scanning protocol by means of Move Up button and Move Down button as described below. Below selection area 234, the case composition 240 is preferably displayed in terms of the laterality and views listed as they are expected to be loaded into the scanner, with the top film listed on the top.

Figure 3:
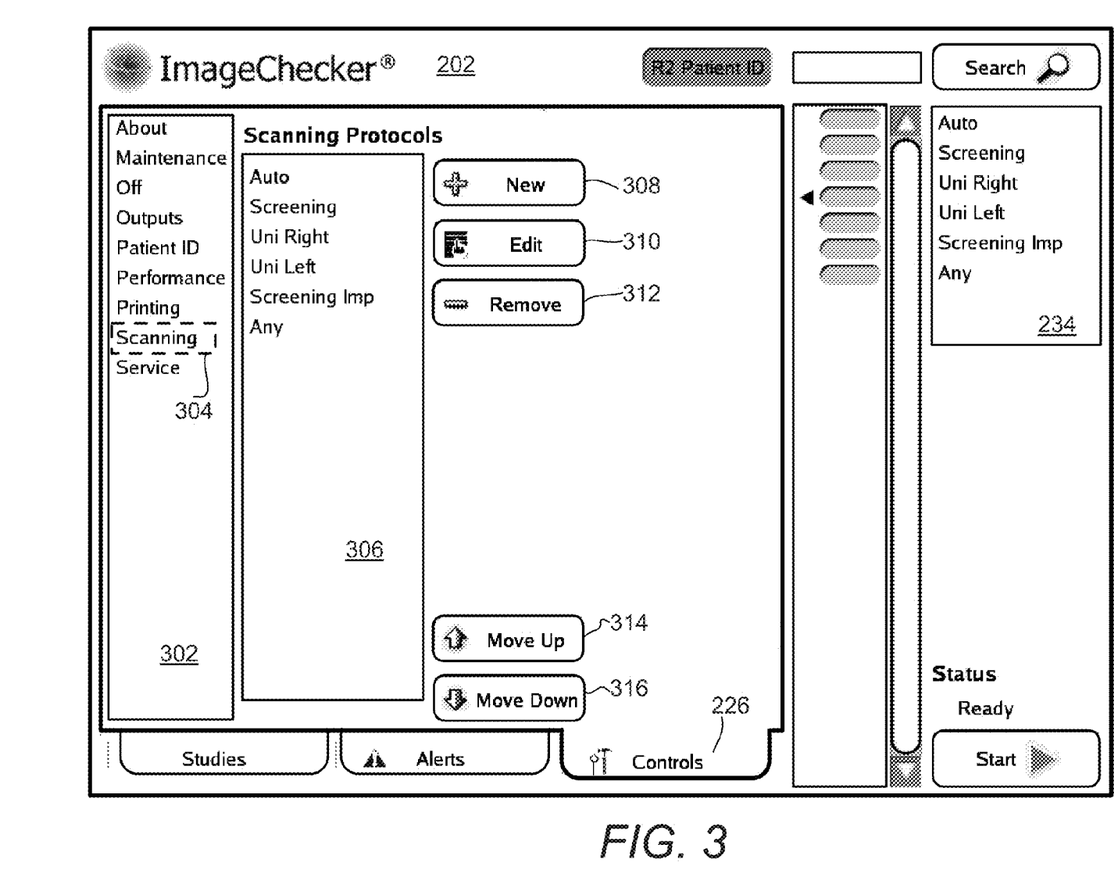
FIG. 3 illustrates a display screen corresponding to the CAD station of FIG. 1, for creating, editing and removing scanning protocols, according to embodiments.

FIG. 3 illustrates display screen 202 corresponding to the CAD station of FIG. 1, for creating, editing and removing scanning protocols, according to embodiments. The user initiates the process by touching the controls tab 226. Controls selection area 302 is shown with various control options that are touch screen selectable. The user selects the scanning control 304 from the list in controls selection area 302. By selecting scanning controls 304, the system generates and displays a list of existing scanning protocols in scanning protocol list area 306. Note that the scanning protocols listed in area 306 preferably corresponds to the list displayed in protocol selection area 234. The user indicates the intention to create a new scanning protocol by touching new button 308. Also shown in FIG. 3 is Edit button 310, used to indicate the user's intention to edit and existing scanning protocol. Remove button 312 is used to indicate the user's intention to permanently delete an existing scanning protocol. After remove button 312 is touched there is preferably a warning window displayed with text such as "You are about to remove a scanning protocol. Are you sure?" Move Up button 314 and Move Down button 316 are used for re-ordering the list of scanning protocols. The scanning protocol at the top of the list is preferably always the default scanning protocol.

Figure 4A:
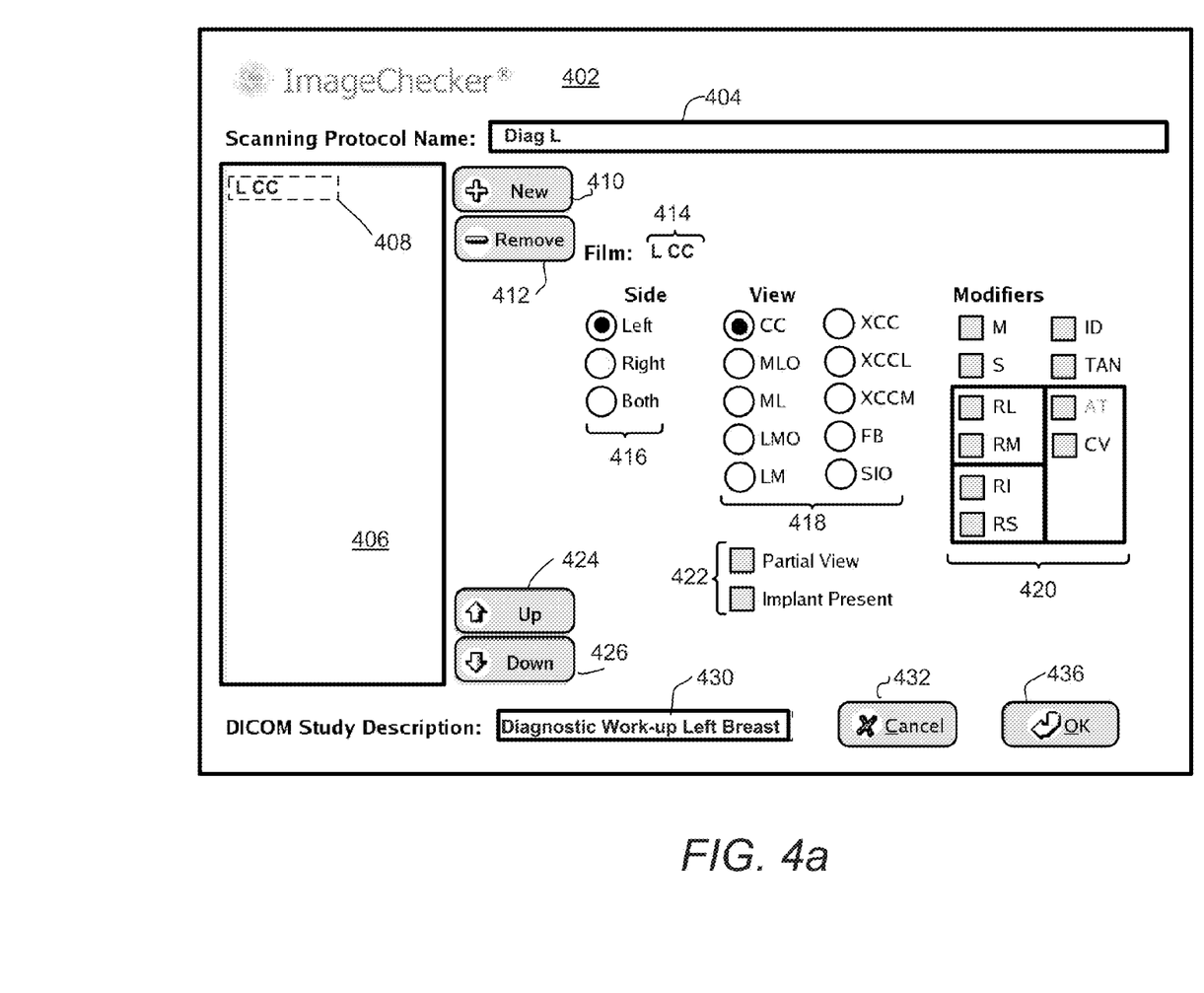
FIGS. 4a-b illustrate a scanning protocol template screen for creating and editing scanning protocols, according to embodiments.
Figure 4B:
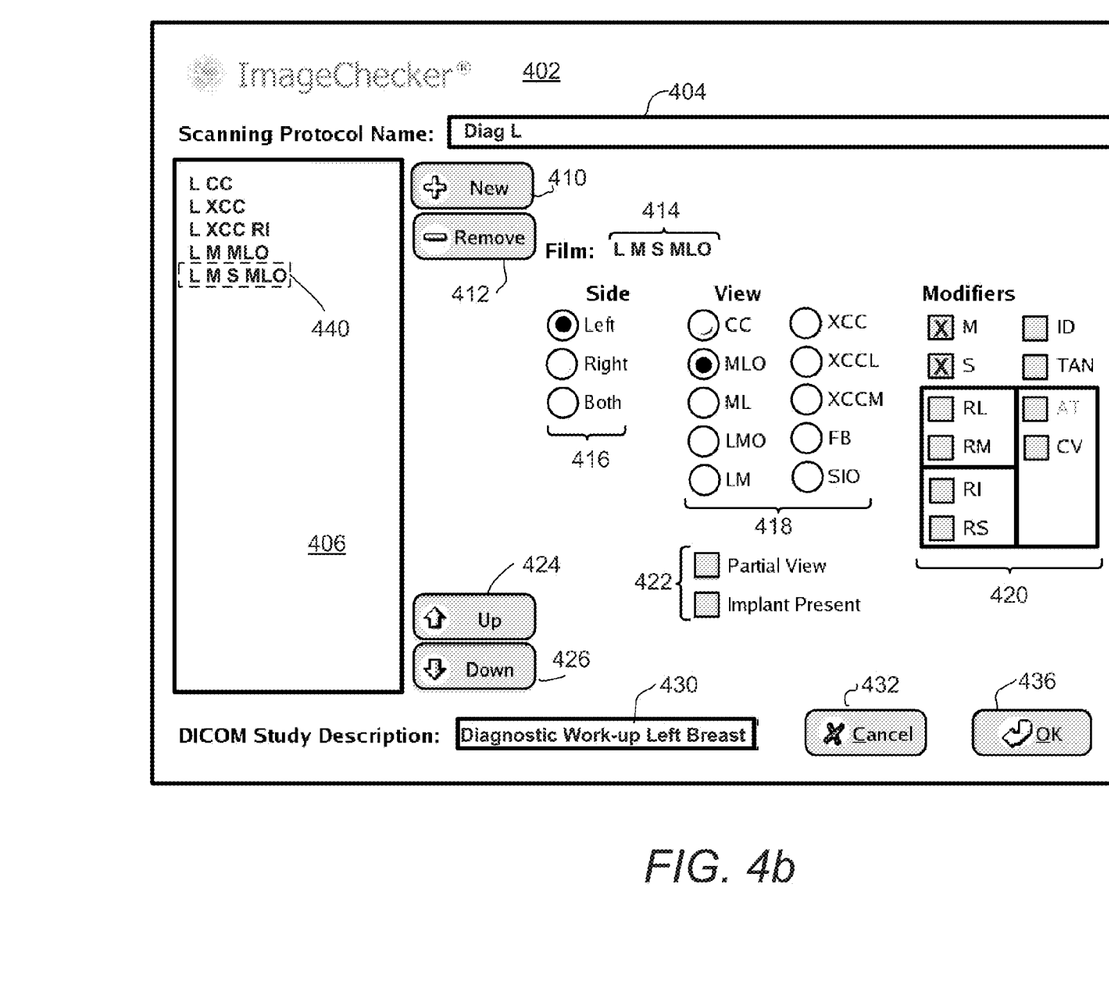

FIGS. 4a-b illustrate scanning protocol template screen 402, for creating and editing scanning protocols, according to embodiments. In response to receiving the user's intention to create and/or edit a scanning protocol, scanning protocol template screen 402 is preferably displayed as shown in FIG. 4a. Screen 402 includes scanning protocol name area 404 which either displays the name of the protocol being edited, or in the case where a new protocol is being created, allows the entry of the name of the new scanning protocol. The user can preferably use this field to edit the name of an existing scanning protocol. The name of the scanning protocol in area 404 is preferably identical to the name used in the scanning protocol selection area 234 shown and described with respect to FIG. 2. Also provided in screen 402 is a DICOM study description area 430. DICOM study description 430 is used for entry, display and editing of the DICOM study description, which is preferably used by workstations to determine how to display (or hang) the digitized film images when using a system such as DigitialNow™ from R2 Technology, a Hologic® company. For users who make use of the DICOM study description field, the DICOM study description and the scanning protocol name can be the same, or the scanning protocol name can be an abbreviation of the DICOM study description or any other unique string. Film list area 406 is used to display the order of the films that will be included for each case in the scanning protocol. In the example of FIG. 4a, one film is shown that is currently identified as L CC. The user indicates an intention to modify the settings for a film in the case by selecting the film, such as L CC film 408, in film list area 406. New button 410 allows for the user to add new films to the protocol for the case. Remove button 412 allows for the user to delete a selected film. The name of the current film is preferably displayed in area 414, which corresponds to the film selected and preferably highlighted, in area 406. Area 416 is used to identify the film as left, right or both. Area 418 is used to identify the view type of the film. Area 420 is used to add modifiers to the film, and Area 422 used to indicate when the film is a partial view and/or there is an implant present. FIG. 4b illustrates an example with a total of five films added using new button 410 and the identifying fields 416, 418, 420 and 422. Film "L M S MLO" 440 is currently highlighted and is shown in area 414. Up and down buttons 424 and 426 are used to re-arrange the order of the films in the scanning protocol, and as displayed in film list area 406. If the user is not satisfied with changes made, the user has the option of cancelling all the current changes by touching the cancel button 432. If the user is satisfied with the changes made, then the OK button 436 is touched and the edited or new scanning protocol is saved.

Figure 5:
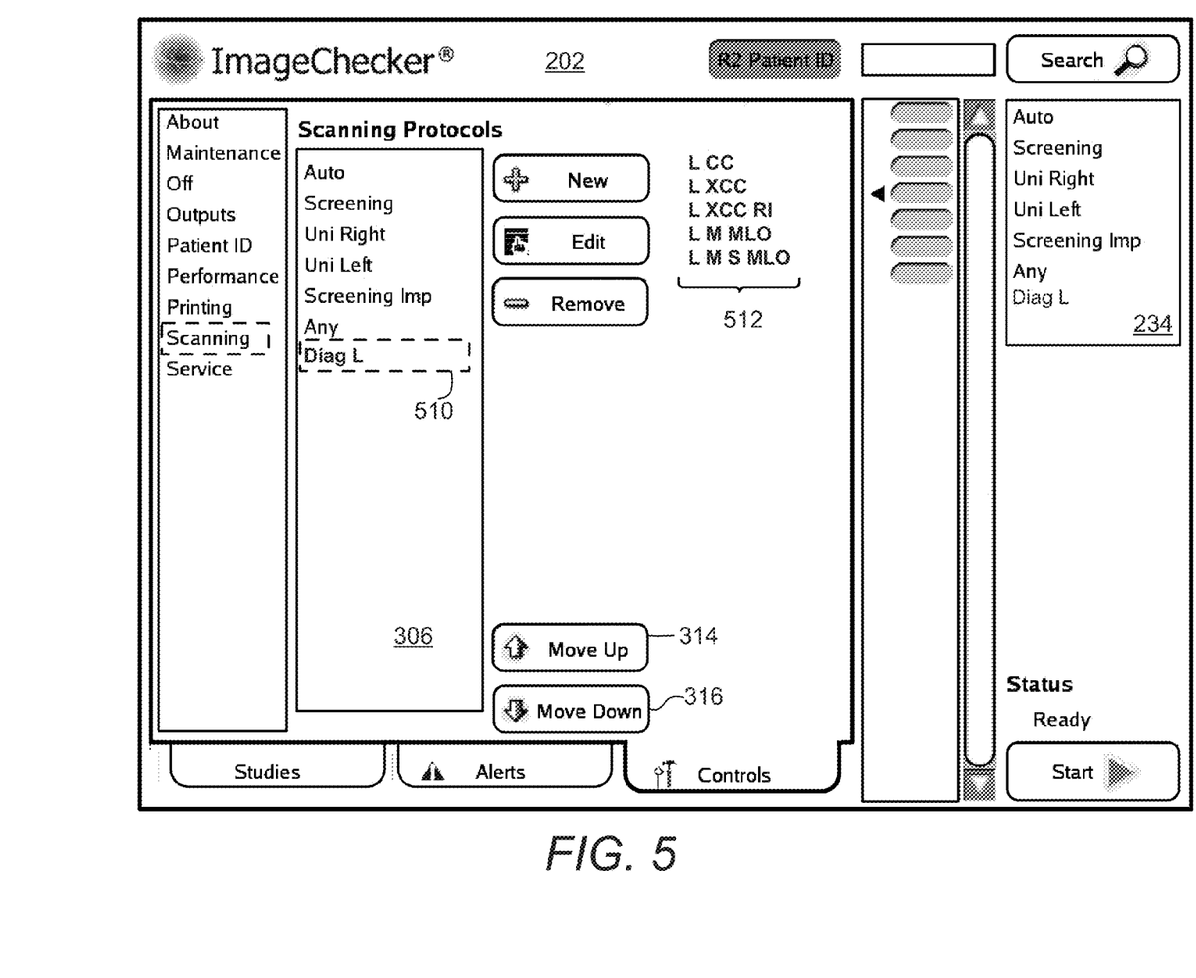
FIG. 5 illustrates a display screen corresponding to the CAD station of FIG. 1, for creating, editing and removing scanning protocols, according to embodiments.

FIG. 5 illustrates display screen 202 corresponding to the CAD station of FIG. 1, for creating, editing and removing scanning protocols, according to embodiments. In particular, FIG. 5 shows a view of screen 202 with a newly added scanning protocol 506 named "Diag L" in scanning protocol list area 306. The new scanning protocol is also preferably displayed in protocol selection area 234. When a protocol is selected in area 306, the order of films in the case is displayed in area 512.

According to an embodiment, the default scanning protocol can be assigned by re-arranging the order of the scanning protocol list in area 306 using the move up and move down buttons 314 and 316 respectively. For example the newly created scanning protocol 510 can be assigned as the default by selecting it and repeatedly touching move up button 314 until protocol 510 is at the top of the list.

Figure 6:
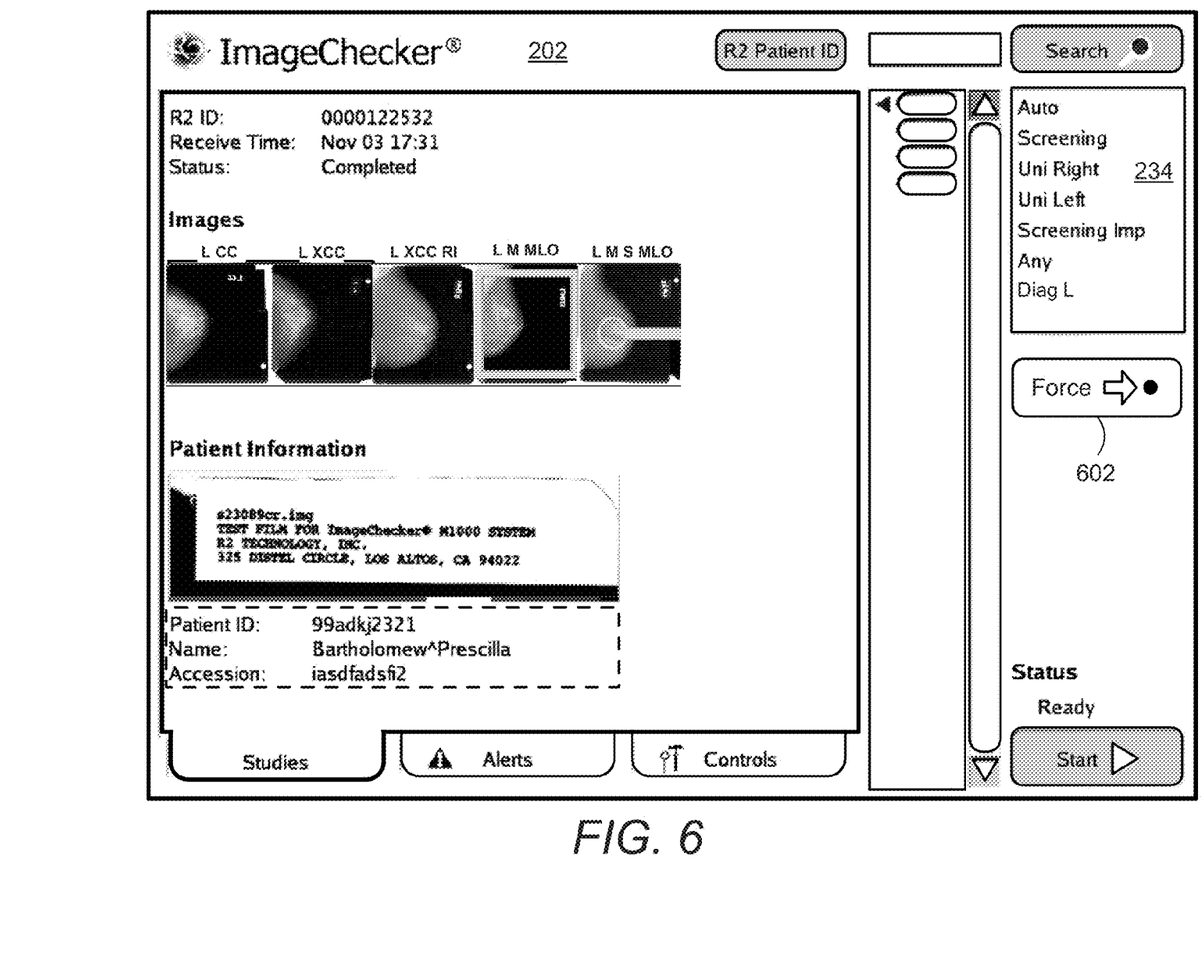
FIG. 6 illustrates a display screen corresponding to the CAD station of FIG. 1 according to embodiments.

FIG. 6 illustrates a display screen 202 corresponding to the CAD station of FIG. 1 according to an embodiment. The embodiment illustrated in FIG. 6 is similar to the screen shown and described with respect to FIG. 2, except that a force button 602 if provided. Force button 602 is used to override the scanning protocol used to originally scan the case and instead assign another scanning protocol to the case. For example, if the "Auto" scanning protocol was used for scanning the case shown in FIG. 6, and in fact the case should have been scanned using the "Diag L" scanning protocol, the user can select "Diag L" from protocol selection area 234, and then touch force button 602. The system will retroactively assign the selected scanning protocol for the current case, and identify all the films in the case according to the newly selected scanning protocol. This feature advantageously provides for quick and efficient identification of films by avoiding a manual identification process.

Figure 7:
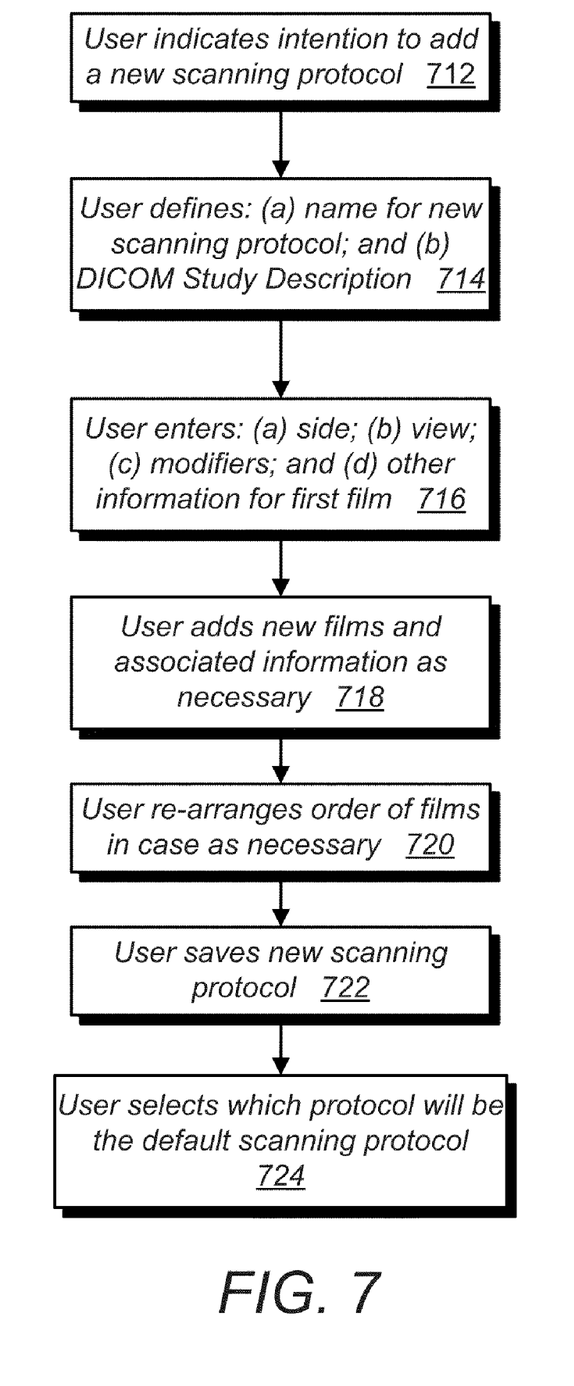
FIG. 7 illustrates steps involved in creating a new scanning protocol, according to embodiments.

FIG. 7 illustrates steps involved in creating a new scanning protocol, according to embodiments. In step 712, the user indicates an intention to add a new scanning protocol. In the example of FIG. 3, this is accomplished by selecting controls tab 226, scanning control 304, and then new button 308. In step 714, the user defines a name for the new scanning protocol and optionally a DICOM study description. In the example of FIGS. 4a-b, this is accomplished by entering the information in areas 404 and 430. In step 716, the user enters the identification information such as laterality (side), view, modifiers, etc. associated with the first film in the case. In the example of FIGS. 4a-b, this is accomplished by entering the information in fields 416, 418, 420 and 422. In step 718, new films are added as necessary and the identification information is added for each new film. In the example of FIGS. 4a-b. This is accomplished by selecting new button 410, and then entering information in fields 416, 418, 420 and 422 for each new film. In step 720, the user re-arranges the order of the films of the case as necessary to correspond to the expected stack order of the films as will be loaded in the scanner, with the top being scanned first. In the example of FIGS. 4a-b, selecting films in area 406 and up and down buttons 424 and 426 are used to accomplish this step. In step 722, the user saves the newly created scanning protocol. In the example of FIGS. 4a-b, this is accomplished using OK button 436.

Figures 8, 9:
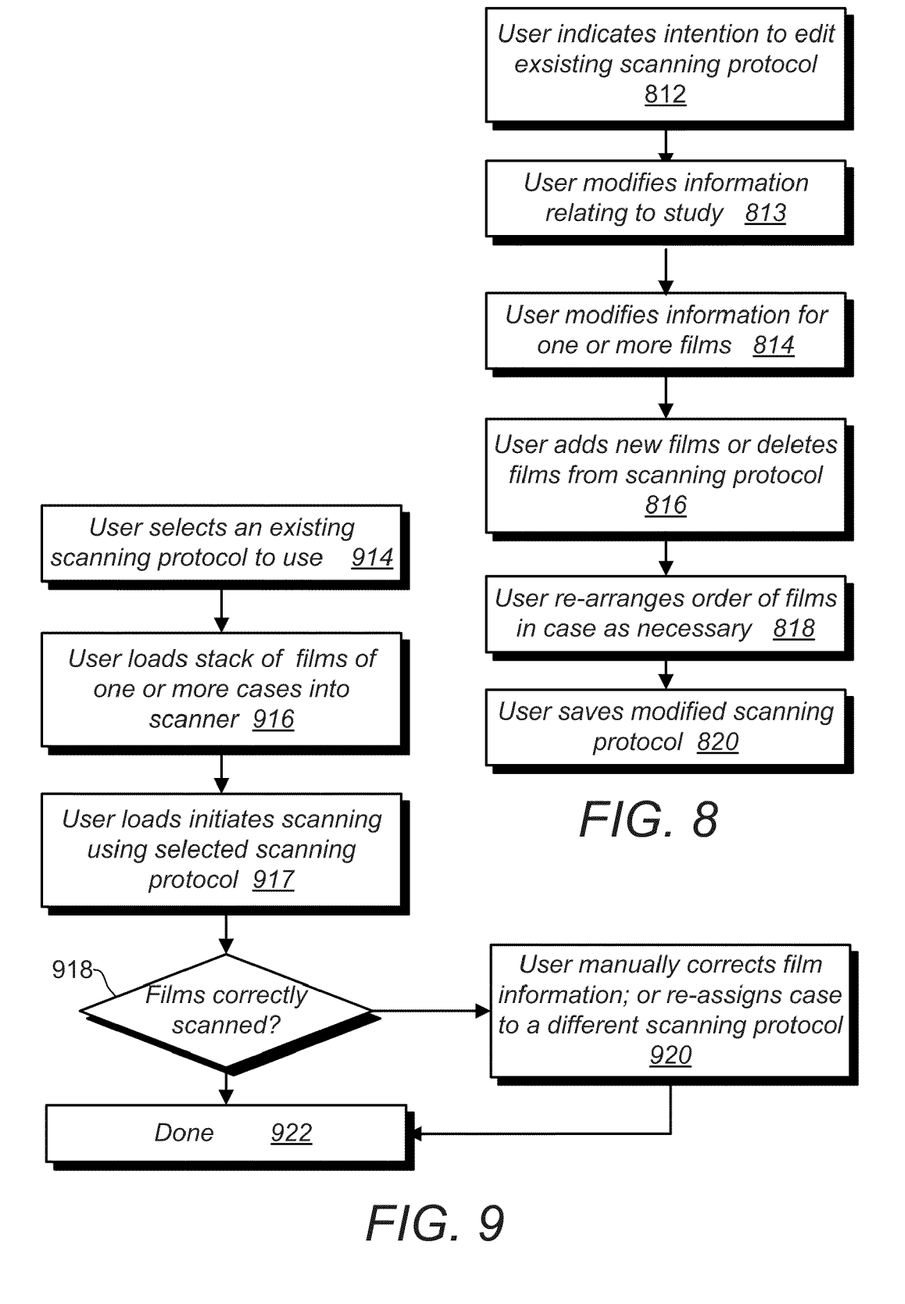
FIG. 8 illustrates steps involved in editing an existing scanning protocol, according to embodiments.
FIG. 9 illustrates steps involved in scanning films using a scanning protocol, according to embodiments.

FIG. 8 illustrates steps involved in editing an existing scanning protocol, according to embodiments. In step 812, the user indicates an intention to edit and existing scanning protocol. In the example of FIG. 3, this is accomplished by selecting controls tab 226, scanning control 304, and then edit button 310. In step 813, the user enters information relating to the study to be scanned. In the example of FIGS. 4a-b this is accomplished by entering the scanning protocol name in area 404 and study description in area 430. In step 814, the user modifies information for one or more films. In the example of FIGS. 4a-b, this is accomplished by entering or altering the information in fields 416, 418, 420 and 422 for each film. In step 816, the user adds new films or deletes films from the scanning protocol. In the example of FIGS. 4a-b, this is accomplished using new and remove buttons 410 and 412 respectively. In step 818, the user re-arranges the order of the films of the case as necessary to correspond to the expected stack order of the films as will be loaded in the scanner, with the top being scanned first. In the example of FIGS. 4a-b, selecting films in area 406 and up and down buttons 424 and 426 are used to accomplish this step. In step 820, the user saves the modified scanning protocol.

FIG. 9 illustrates steps involved in scanning films using a scanning protocol, according to embodiments. In step 914, the user indicates an intention to scan a new case or a multiple cases, and selects an existing scanning protocol to use. In the example of FIG. 2, this is accomplished by choosing and selecting a scanning protocol from protocol selection area 234. In step 916, the user loads a stack of films making up one or more cases into the scanner. This is preferably accomplished by placing a separator sheet on the top of each case, as more fully described in WO 02/45437A2. The stack of films is positioned in the input tray of the scanner feeder. In step 917, the user initiates scanning using the selected scanning protocol. This is preferably accomplished by the user pressing the start button on display 202. If no scanning protocol was selected in step 914, then the default scanning protocol will be used. In step 918, the user monitors the scanning process as described more fully in Published US Patent Application No. US20060126909A1, Ser. No. 10/998,121. If an error is detected in the scanning process, in step 920, the user can manually correct the film information using a screen that is similar to that shown in FIGS. 4a-b, or the user can re-assign the case to a different scanning protocol, as shown and described with respect to FIG. 6. In step 922, the scanning process is completed.

Whereas many alterations and modifications of the present invention will no doubt become apparent to a person of ordinary skill in the art after having read the foregoing description, it is to be understood that the particular embodiments shown and described by way of illustration are in no way intended to be considered limiting. It is to be appreciated, for example, that several of the user interface embodiments described supra are applicable in a digital-only mammographic environment where easy monitoring and control or the digital case receiving, processing, and dispensing is desired. The graphical status indicator can be horizontally oriented, diagonally oriented, etc., without departing from the scope of the embodiments. Further types of temporal changes in icon appearance other than blinking, such as rotating icons, can be used as visual textures or cues without departing from the scope of the embodiments. Even further, although particular reference is made to digital x-ray mammography, the scope of the embodiments includes any of a variety of medical imaging modalities that, either presently or prospectively, are amenable to CAD analysis and/or softcopy display. Present or prospective examples including computerized tomography (CT) imaging, magnetic resonance imaging (MRI), positron emission tomography (PET), single-photon emission computed tomography (SPECT), and ultrasound, as well as less conventional medical imaging modalities such as thermography, electrical conductivity-based modalities, etc. Therefore, reference to the details of the embodiments are not intended to limit their scope, which is limited only by the scope of the claims set forth below.

What is claimed is:

1. A system for processing film-based mammographic data, comprising:
    a storage system programmed and arranged to store at least one standard scanning protocol, wherein each said standard scanning protocol identifies, by laterality and view type, each of a plurality of mammographic films in a standard film case, and wherein each said standard scanning protocol further identifies a sequence in which the plurality of mammographic films in the standard film case are to be provided in stacked form to a film digitizer for scanning;
    a user input/output system adapted and configured to receive from at least one user at least one user-defined scanning protocol, wherein each said user-defined scanning protocol identifies, by laterality and view type, each of a plurality of mammographic films in a user-defined film case and a sequence in which the plurality of mammographic films in the user-defined film case are to be provided in stacked form to the film digitizer for scanning, the at least one user-defined scanning protocol being stored in said storage system and being different than said standard scanning protocol with respect to at least one of laterality, view type, and sequence for one or more mammographic films;
    a scanning system adapted to receive and scan a plurality of film cases, generating therefrom a digitized version of each mammographic film, the scanning system including the film digitizer and receiving the plurality of film cases in stacked form for scanning thereby;
    said user input/output system being further adapted and configured to receive, in association with the plurality of film cases in stacked form received for scanning by the film digitizer, at least one user input indicative of a selected scanning protocol for each respective film case, said scanning protocol selection being from among a plurality of scanning protocols including said at least one standard scanning protocol and said at least one user-defined scanning protocol; and
    a processor in communication with said storage system, said scanning system, and said user input/output system and being adapted and programmed to assign laterality and view type to each said digitized version of each scanned mammographic film according to the selected scanning protocol associated therewith, said user input/output system being further adapted to receive a user's instruction to re-assign a case scanned according to a first scanning protocol to a second scanning protocol, said processor being adapted to automatically assign the laterality and view type to each digitized version according to the second scanning protocol in response to the user's instruction.

2. A system according to claim 1, wherein said standard scanning protocols include a first standard scanning protocol identifying four (4) mammographic films having a laterality, view type, and sequence of: RMLO, LMLO, RCC, and LCC.

3. A system according to claim 1, wherein the plurality of scanning protocols from which the selected scanning protocol can be selected further includes an "Auto" scanning protocol, and wherein said processor is configured to automatically assign laterality and view type for associated "Auto" scanning protocol film cases based on lead marker recognition and one or more predetermined assumptions of case composition.

4. A system according to claim 1, wherein the plurality of scanning protocols from which the selected scanning protocol can be selected further includes an "Any" scanning protocol, and wherein said processor is configured to assign laterality and view type for associated "Any" scanning protocol film cases based on manual user input subsequent to said scanning.

5. A system according to claim 1, wherein said user input/output system is further adapted to receive a user's selection of which of the plurality of scanning protocols is be used as a default scanning protocol, and wherein said processor is configured to assign laterality and view type according to the default scanning protocol for cases in which no scanning protocol selection is made.

6. A system according to claim 1 wherein said user input/output System and said storage system are located in different facilities and said communication is made via a wide area network.

7. A system according to claim 1 wherein said processor is further adapted to process the digitized versions according to at least one computer aided detection (CAD) algorithm for detecting anatomical abnormalities therein.

8. A method for processing film-based mammographic data, comprising the steps of:
    receiving from at least one user at least one user-defined scanning protocol, wherein each said user-defined scanning protocol identifies, by laterality and view type, each of a plurality of mammographic films in a user-defined film case and a sequence in which the plurality of mammographic films in the user-defined film case are to be provided in stacked form to a film digitizer for scanning;
    storing the a user-defined scanning protocol in a storage system, the storage system further storing at least one standard scanning protocol identifying, by laterality and view type, each of a plurality of mammographic films in a standard film case and a sequence in which the plurality of mammographic films in the standard film case are to be provided in stacked form to the film digitizer for scanning, wherein the at least one user-defined scanning protocol is different than said standard scanning protocol with respect to at least one of laterality, view type, and sequence for one or more mammographic films;
    receiving, at a scanning system including the film digitizer, a plurality of film cases in stacked form for scanning thereby, each film case including a plurality of mammographic films in stacked form;
    receiving, in association with the plurality of film cases in stacked form received for scanning by the film digitizer, at least one user input indicative of a selected scanning protocol for each respective film case, said scanning protocol selection being from among a plurality of scanning protocols including said at least one standard scanning protocol and said at least one user-defined scanning protocol;
    scanning each of said plurality of film cases and generating therefrom a digitized version of each mammographic film therein; and assigning laterality and view type to each said digitized version of each scanned mammographic film according to the selected scanning protocol associated therewith;

receiving a user's instruction to reassign a case scanned according to a first scanning protocol to a second scanning protocol; and automatically assigning the laterality and view type to each digitized version according to the second scanning protocol in response to the user's instruction.

9. A method according to claim 8, wherein said standard scanning protocols include a first standard scanning protocol identifying four (4) mammographic films having a laterality, view type, and sequence of: RMLO, LMLO, RCC, and LCC.

10. A method according to claim 8, wherein the plurality of scanning protocols from which the selected scanning protocol are selected further includes an "Auto" scanning protocol, and wherein the laterality and view type for associated "Auto" scanning protocol film cases are automatically assigned based on lead marker recognition and one or more predetermined assumptions of case composition.

11. A method according to claim 8, wherein the plurality of scanning protocols from which the selected scanning protocol can be selected further includes an "Any" scanning protocol, and wherein the laterality and view type for associated "Any" scanning protocol film cases are assigned based on manual user input subsequent to said scanning.

12. A method according to claim 8, further comprising receiving a user's selection of which of the plurality of scanning protocols is be used as a default scanning protocol, wherein said laterality and view types are assigned according to the default scanning protocol for cases in which no scanning protocol selection is made.

13. A method according to claim 8, further comprising processing the digitized versions according to at least one computer aided detection (CAD) algorithm for detecting anatomical abnormalities therein.

14. A non-transitory computer readable medium tangibly embodying one or more sequences of instructions wherein execution of the one or more sequences of instructions by one or more processors causes the one or more processors to carry out processing of film-based mammographic data according to the steps of:

receiving from at least one user at least one user-defined scanning protocol, wherein each said user-defined scanning protocol identifies, by laterality and view type, each of a plurality of mammographic films in a user-defined film case and a sequence in which the plurality of mammographic films in the user-defined film case are to be provided in stacked form to a film digitizer for scanning;

storing the a user-defined scanning protocol in a storage system, the storage system further storing at least one standard scanning protocol identifying, by laterality and view type, each of a plurality of mammographic films in a standard film case and a sequence in which the plurality of mammographic films in the standard film case are to be provided in stacked form to the film digitizer for scanning, wherein the at least one user-defined scanning protocol is different than said standard scanning protocol with respect to at least one of laterality, view type, and sequence for one or more mammographic films;

receiving a plurality of digitized versions of a respective plurality of mammographic films scanned by the film digitizer, the mammographic films corresponding to a plurality of film cases, the plurality of film cases being received in stacked form for scanning by the film digitizer;

receiving, in association with the plurality of film cases in stacked form received for scanning by the film digitizer, at least one user input indicative of a selected scanning protocol for each respective film case, said scanning protocol selection being from among a plurality of scanning protocols including said at least one standard scanning protocol and said at least one user-defined scanning protocol; and assigning laterality and view type to each said digitized version of each scanned mammographic film according to the selected scanning protocol associated therewith;

receiving a user's instruction to re-assign a case scanned according to a first scanning protocol to a second scanning protocol, and automatically assigning the laterality and view type to each digitized version according to the second scanning protocol in response to the user's instruction.

15. The computer readable medium of claim 14, wherein said standard scanning protocols include a first standard scanning protocol identifying four (4) mammographic films having a laterality, view type, and sequence of: RMLO, LMLO, RCC, and LCC.

16. The computer readable medium of claim 14, wherein the plurality of scanning protocols from which the selected scanning protocol is selected further includes an "Any" scanning protocol, and wherein the laterality and view type for associated "Any" scanning protocol film cases are assigned based on manual user input subsequent to said receiving the digitized versions.

17. The computer readable medium of claim 14, said processing of film-based mammographic data further comprising receiving a user's selection of which of the plurality of scanning protocols is be used as a default scanning protocol, wherein said laterality and view types are assigned according to the default scanning protocol for cases in which no scanning protocol selection is made.

* * * * *